US00RE42806E

(19) United States
(12) Reissued Patent
Kamiya et al.

(10) Patent Number: US RE42,806 E
(45) Date of Reissued Patent: Oct. 4, 2011

(54) NAVIGATION APPARATUS

(75) Inventors: Masahiro Kamiya, Kobe (JP); Shuu Ishikawa, Kobe (JP)

(73) Assignee: Fujitsu Ten Limited, Hyogo (JP)

(21) Appl. No.: 11/372,451

(22) PCT Filed: Feb. 28, 2002

(86) PCT No.: PCT/JP02/01829

§ 371 (c)(1),
(2), (4) Date: Nov. 1, 2002

(87) PCT Pub. No.: WO02/070991

PCT Pub. Date: Sep. 12, 2002

Related U.S. Patent Documents

Reissue of:
(64) Patent No.: 6,862,520
Issued: Mar. 1, 2005
Appl. No.: 10/275,045
Filed: Nov. 1, 2002

(30) Foreign Application Priority Data

Mar. 2, 2001 (JP) ..... P2001-58819

(51) Int. Cl.
*G01C 21/00* (2006.01)

(52) U.S. Cl. ..... 701/200; 701/208; 701/211; 701/212; 340/995.17

(58) Field of Classification Search ..... 701/200, 701/207, 208, 211, 212; 340/988, 995.1, 340/995.17
See application file for complete search history.

(56) References Cited

U.S. PATENT DOCUMENTS

| | | | | |
|---|---|---|---|---|
| 3,688,312 | A | 8/1972 | Gustafson et al. | |
| 5,945,927 | A | 8/1999 | Nakayama et al. | |
| 6,059,660 | A | 5/2000 | Takada et al. | |
| 6,196,845 | B1 | 3/2001 | Streid | |
| 6,226,534 | B1 | 5/2001 | Aizawa | |
| 6,539,289 | B2 | 3/2003 | Ogino et al. | |
| 6,640,185 | B2 * | 10/2003 | Yokota et al. | 701/208 |
| 2002/0041273 | A1 | 4/2002 | Dirksen et al. | |

FOREIGN PATENT DOCUMENTS

| | | |
|---|---|---|
| EP | 0836167 | 4/1998 |
| EP | 0841537 | 5/1998 |
| EP | 0896315 | 2/1999 |
| JP | 5-241502 | 9/1993 |
| JP | 7-141598 | 6/1995 |
| JP | 7-272196 | 10/1995 |
| JP | 8-128839 | 5/1996 |
| JP | 8-178684 | 7/1996 |
| JP | 9-212286 | 8/1996 |
| JP | 9-212286 | 8/1997 |
| JP | 10-122876 | 5/1998 |

(Continued)

*Primary Examiner* — Gertrude Arthur Jeanglaud
(74) *Attorney, Agent, or Firm* — Wenderoth Lind & Ponack, L.L.P.

(57) ABSTRACT

A navigation apparatus including a joystick which is adapted for three motions of leaning in a plurality of predetermined directions, rotating about an axial line and being pressed in a direction along the axial line. As a result of these three motions, an operation of this joystick can be provided with a lot of navigation functions, and, as compared with the prior art, the number of switches of a remote controller and an operation panel section can be decreased.

42 Claims, 14 Drawing Sheets

FOREIGN PATENT DOCUMENTS

| | | |
|---|---|---|
| JP | 10-197263 | 7/1998 |
| JP | 10-214128 | 8/1998 |
| JP | 10-268759 | 10/1998 |
| JP | 10-301485 | 11/1998 |
| JP | 11-153441 | 6/1999 |
| JP | 11-184607 | 7/1999 |
| JP | 11-271084 | 10/1999 |
| JP | 11-304503 | 11/1999 |
| JP | 11-304505 | 11/1999 |
| JP | 2000-61142 | 2/2000 |
| JP | 2000-180188 | 6/2000 |
| JP | 2000-241190 | 9/2000 |
| JP | 2000-314633 | 11/2000 |
| JP | 2000-346669 | 12/2000 |
| JP | 2000-347792 | 12/2000 |
| JP | 2002-81942 | 3/2002 |
| JP | 2002-243485 | 8/2002 |
| JP | 2005-292846 | 10/2005 |

* cited by examiner

NAVIGATION APPARATUS

Matter enclosed in heavy brackets [ ] appears in the original patent but forms no part of this reissue specification; matter printed in italics indicates the additions made by reissue.

*This application is a reissue of U.S. Pat. No. 6,862,520, issued Mar. 1, 2005.*

BACKGROUND OF THE INVENTION

1. Field of the Invention

The present invention relates to a navigation apparatus which is mounted in a vehicle.

2. Description of the Related Art

A Prior art on-board navigation apparatus having a plurality of navigation functions of setting a destination, scaling a map, deriving a route and the like in addition to displaying a present position of a vehicle and a surrounding road map has been disclosed in Japanese Unexamined Patent Publications JP-A 10-122876 (1998) and JP-A 10-197263 (1998). The prior art navigation apparatus is equipped with a joystick as an operation device, and the joystick is capable of a leaning motion in a plurality of directions and a pressing motion in a direction of an axial line of the joystick.

In a multifunction navigation apparatus which utilizes this joystick, which is capable of only the two described motions, the joystick cannot be provided with a lot of operations. Therefore, a lot of icons for individual functions are displayed on display means, or a lot of switches are needed on an operation panel section. In the case of a navigation apparatus having such a configuration, a user is required to check the position of an icon and a switch to perform each function, which is inconvenient. Moreover, the number of parts of an operation panel and a remote controller is large.

Therefore, an object of the present invention is to provide a user-friendly navigation apparatus.

SUMMARY OF THE INVENTION

The present invention is a navigation apparatus mounted in a vehicle. The navigation apparatus according to the present invention comprises display means; a joystick which is capable of leaning in a plurality of predetermined directions, rotating about a predetermined axial line of the joystick, and being pressed in (depressed) in a direction along the axial line of the joystick; and control means for changing a display state of the display means according to a motion of the joystick.

According to the present invention, the navigation apparatus mounted in a vehicle comprises display means, a joystick disposed on an operation panel section or a remote controller, and control means for changing a display state of the display means according to a motion of the joystick. The joystick of the present invention is capable of performing the following three motions: a leaning motion in a plurality of predetermined directions; a rotating motion about a predetermined axial line of the joystick; and a pressing (depressing) motion in a direction of the axial line. Since the number of operations of navigation functions given to this joystick increases as a result of the three described motions which the joystick is capable of performing, it is possible to decrease the number of icons displayed on the display means and the number of switches located on the operation panel section as compared with the prior art.

Further, the present invention is characterized in that a map is displayed on the display means, and the control means rotates the map when the joystick is rotated about the axial line.

According to the present invention, a present position of a vehicle and a road map surrounding the present position of the vehicle are displayed on the display means. When a user rotates the joystick about the axial line, a map displayed on the display means in turn rotates. In the prior art apparatus, the joystick is not rotatable, and hence, the joystick is leaned so as to rotate a map, which makes it difficult for the user to comprehend an operation. On the other hand, in the present invention, the rotating motion of the joystick is associated with a rotation of the map so that it is easy for the user to operate. As a result, it is possible to eliminate a sensory gap in an operation of rotating a map.

Still further, the present invention is characterized in that a map is displayed on the display means, and the control means changes a scale of the map when the joystick is rotated about the axis of the joystick while the joystick is being pressed in the direction of the axis.

Still further, the present invention is characterized in that the control means scales up the map from a displayed state when the joystick is rotated to one side about the axial line while being pressed in the direction of the axial line, and the control means scales down the map from a displayed state when the joystick is rotated to the other side about the axial line while being pressed in the direction of the axial line.

According to the present invention, the joystick is also provided with an operation of changing a scale of the map so that, when changing a scale of the map, there is no need to touch or look for another device such as a switch other than the joystick.

Still further, the present invention is characterized in that a map is displayed on the display means, and the control means scrolls the map when the joystick is leaned and the control means changes a scrolling speed of the map when the joystick is pressed in the direction of the axial line while the joystick is being leaned.

According to the present invention, the user can scroll the map and change a scrolling speed of the map only by an operation of the joystick, and as a result, user-friendliness increases.

Still further, the present invention is characterized in that: a plurality of predetermined navigation functions are provided; items corresponding to the navigation functions and designating means for selecting and designating, a desired item are displayed on the display means; and the control means shifts the designating means when the joystick is leaned, and changes a shifting speed of the designating means when the joystick is pressed in the direction of the axial line in a state of being leaned.

According to the present invention, the user can shift designating means only by an operation of the joystick, for designating an item showing each navigation function and can change a shifting speed of the designating means. As a result, operability of the apparatus is enhanced.

Still further, the present invention is characterized in that a numerical data inputting mode for inputting numerical data is provided; a cursor for inputting the numerical data is displayed on the display means; and the control means increments and decrements a number on the cursor when the joystick is rotated about the axial line, shifts a digit of the cursor when the joystick is leaned, and fixes in inputted numerical data when the joystick is pressed in the direction of the axial line.

Still further, the present invention is characterized in that the numerical data is a telephone number.

Still further, the present invention is characterized in that the numerical data is a post code.

Still further, the present invention is characterized in that the numerical data is latitude and longitude information.

Still further, the present invention is characterized in that the numerical data is position information, which is encoded position data of a specific place or location.

Still further, the present invention is characterized in that the control means increments a number on the cursor when the joystick is rotated to one side about the axial line, and the control means decrements a number on the cursor when the joystick is rotated to the other side about the axial line.

According to the present invention, the navigation apparatus has a numerical data inputting mode for inputting numerical data such as, a telephone number, a post code, latitude and longitude information or position information like map code (trademark), and a cursor for inputting numerical data is displayed on the display means. In this numerical data inputting mode, when the joystick is rotated by the user to one side about the axial line, for example, clockwise, a number on the cursor is incremented, and when the joystick is rotated to the other side about the axial line, for example, counterclockwise, a number on the cursor is decremented. Moreover, when the joystick is leaned by the user, for example, to the right, the cursor shifts to a subsequent digit, and when the joystick is leaned to the left, the cursor shifts to a preceding digit. After ending the input of numerical data by combining the operations of leaning and rotating, the user presses the joystick in the direction of the axial line, whereby the inputted numerical data is fixed. As described above, it is possible, by the use of a single joystick, to perform an operation of changing a number, an operation of shifting a digit and an operation of fixing numerical data, so that user-friendliness, and especially, an operation speed increases. Furthermore, an operation of pressing is not required when inputting a number of each digit, and as a result, it is possible to prevent a misoperation of leaning the joystick by mistake while inputting a number and shifting a digit of the cursor.

BRIEF DESCRIPTION OF THE DRAWINGS

Other and further objects, features, and advantages of the present invention will be more explicit from the following detailed description taken with reference to the attached drawings, in which.

to DETAILED DESCRIPTION OF THE INVENTION

A preferable embodiment of a navigation apparatus according to the present invention will be described below with reference to the attached drawings.

Figure 1:
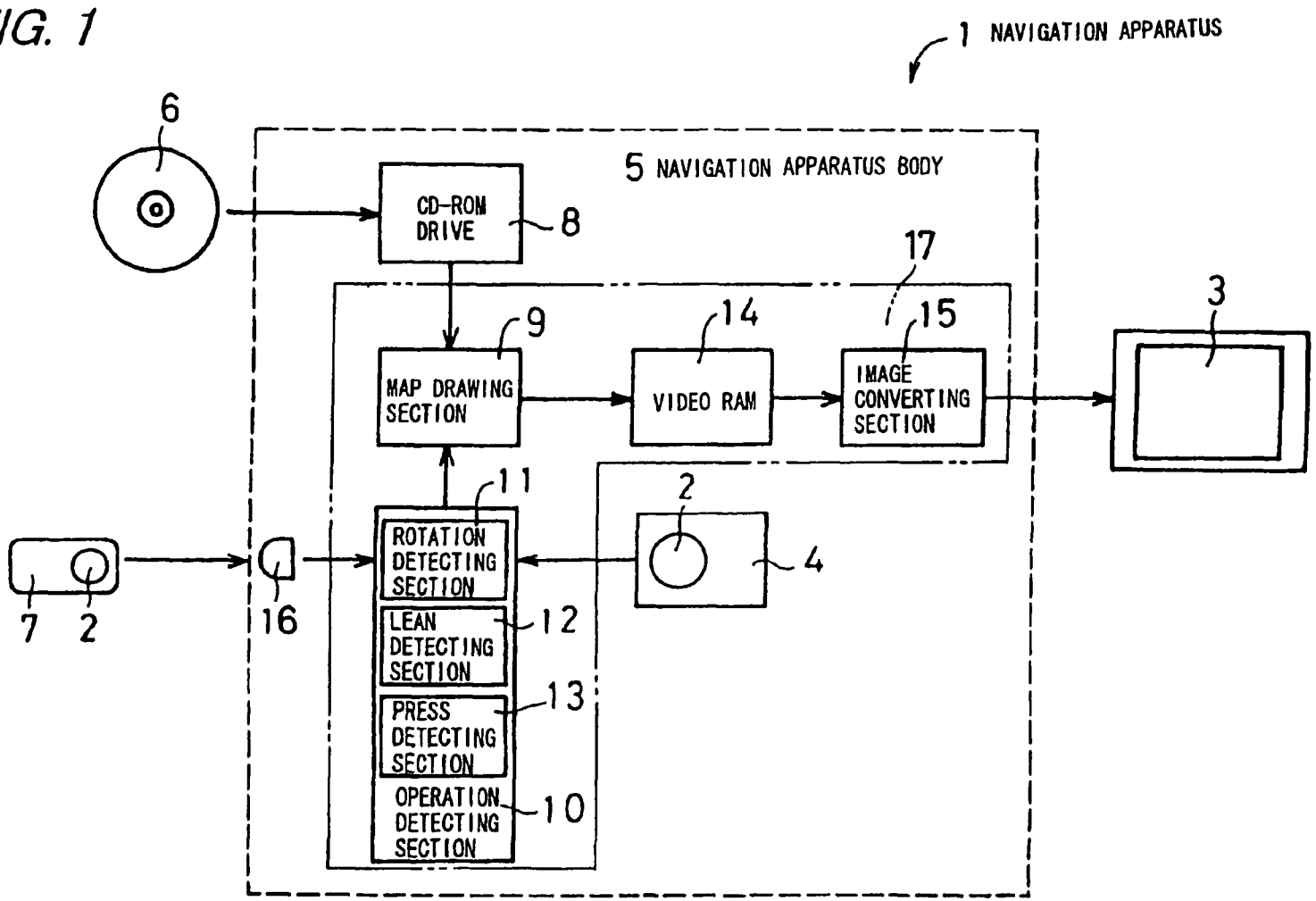
FIG. 1 is a block diagram of a navigation apparatus of an embodiment of the present invention.
Figure 2:
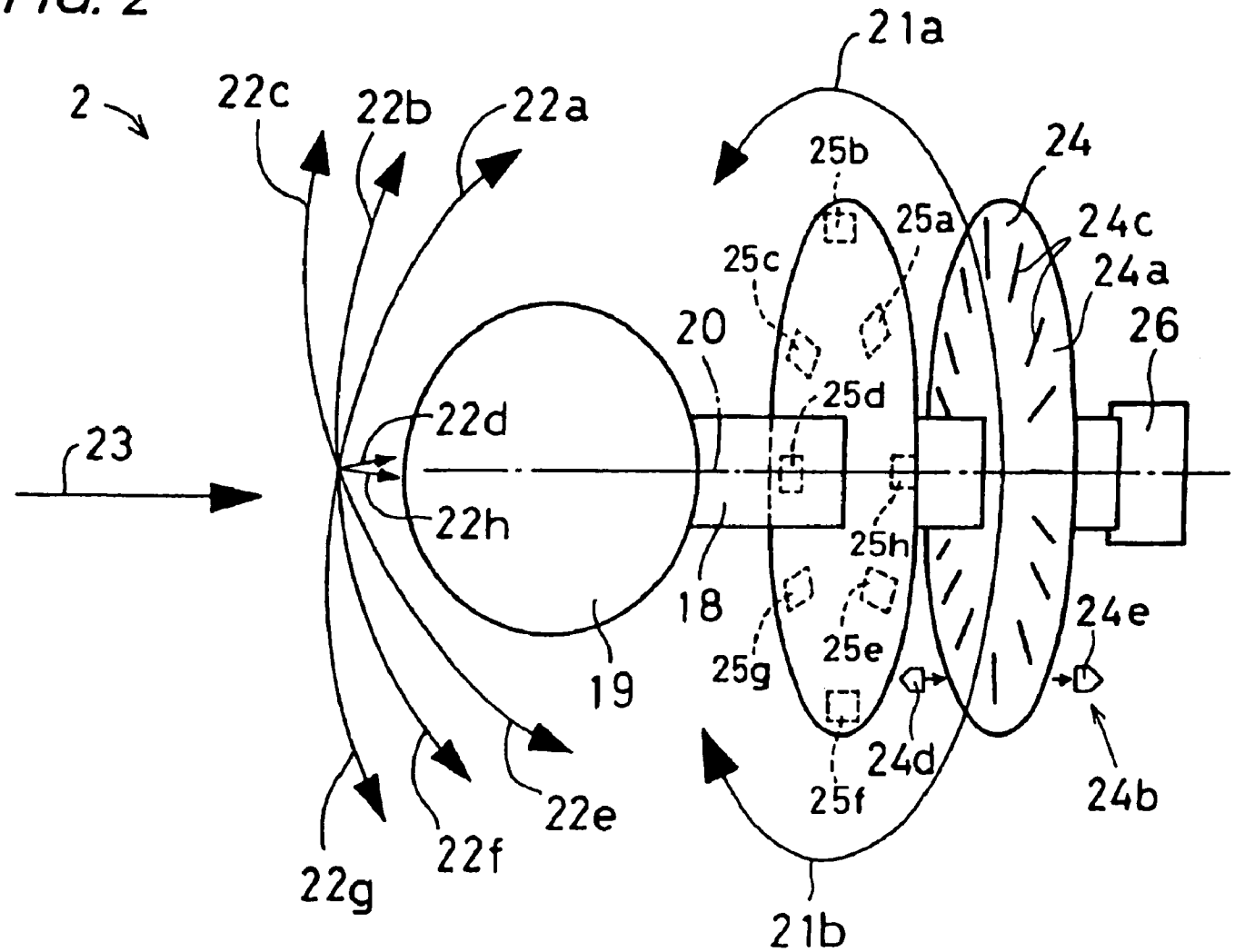
FIG. 2 is a perspective view of a joystick.
Figure 3:
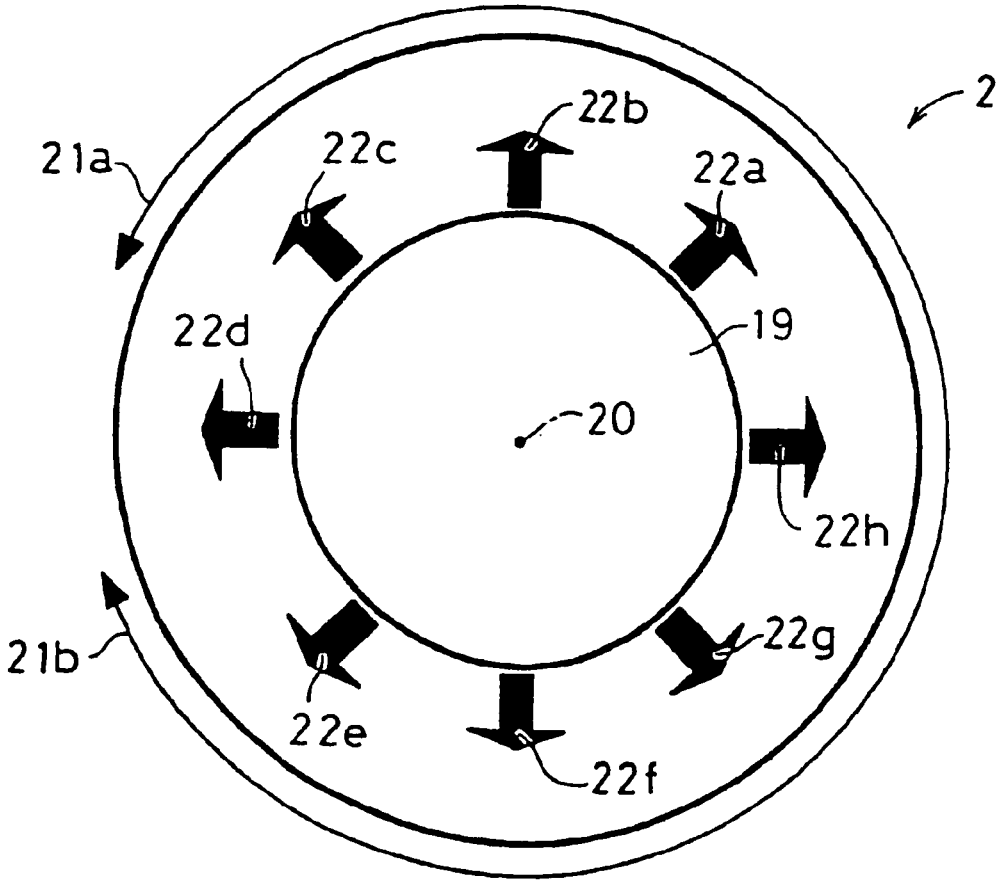
FIG. 3 is a plan view of the joystick.

FIG. 1 is a block diagram of a navigation apparatus 1 of an embodiment of the invention, FIG. 2 is a perspective view of a joystick 2, and FIG. 3 is a plan view of the joystick 2. The navigation apparatus 1 mounted in a vehicle comprises a navigation apparatus body 5 and a display 3 (display means).

The navigation apparatus body 5 includes a CD-ROM (compact disc-read only memory) drive 8, an operation panel section 4, control means 17, and a remote controller light-receiving section 16. The control means 17 includes a map drawing section 9, an operation detecting section 10, a video RAM 14, and an image converting section 15. A maponly disc 6 is loaded to the CD-ROM drive 8, and map data of the map-only disc 6 is read out therefrom by the CD-ROM drive 8. The CD-ROM drive 8 may be a DVD-ROM (digital versatile disc-read only memory) drive. Moreover, the remote controller light-receiving section 16 receives a command signal, which is, for example, an infrared signal from a remote controller 7 that is operated by a user. Furthermore, the operation panel section 4 is provided with a plurality of switches (not shown) and the joystick 2. Besides, the remote controller 7 is also provided with the joystick 2. A command signal received by the remote controller light-receiving section 16 is inputted to the operation detecting section 10. The control means 17 changes a display state of the display 3 in response to a motion of the joystick 2.

As shown in FIGS. 2 and 3, the joystick 2 has an axis portion 18 which protrudes from the surface of the operation panel section 4 of the navigation apparatus 1 and the surface of the remote controller 7, respectively, and a knob portion 19 which is fixed to one end of this axis portion 18. The joystick 2 is capable of three motions of: (1) a rotating motion about an axial line 20 of the axis portion 18 (in both the directions of arrows 21a and 21b); (2) a leaning motion in a plurality of predetermined directions about a connecting portion on the other end of the axis portion 18 away from the knob portion 19 (in the eight directions shown by arrows 22a to 22h in the present embodiment); and (3) a pressing (depressing) motion in a direction along the axial line 20, that is, in a pressing direction from one end of the axis portion 18 nearest the knob portion 19 in the direction of the axial line 20 to the other end of the axis portion 18 away from the knob portion 19 in the direction of the axial line 20 (in a direction of an arrow 23, and towards the back side of a paper sheet of FIG. 3).

An operation of the operation panel section 4 or the remote controller 7 by the user is detected by the operation detecting section 10. Specifically, a rotating operation of the joystick 2 is detected by a rotation detecting section 11 of the operation detection section 10, a leaning operation of the joystick 2 is detected by a lean detecting section 12 of the operation detection section 10, and a pressing (depressing) of the joystick 2 is detected by a press detecting section 13 of the operation detecting section 10.

The rotation detecting section 11 is constituted by including a rotary encoder 24 which detects a rotation angle in a multistage manner, for example. The rotary encoder 24 includes a lightproof board 24a and photocouplers 24b. The lightproof board 24a is formed like a circular disc, and the lightproof board 24a has a plurality of slits 24c on the rim thereof which extend in the radial direction and are spaced mutually in the perimeter direction. The photocouplers 24b are disposed near to both the top and bottom surfaces of the lightproof board 24 so as to be spaced from the lightproof board 24a, and each of the photocouplers 24b includes a light-emitting element 24d, which emits light toward the lightproof board 24a, and a light-receiving element 24e, which receives light from the light-emitting element 24d that passes through the slits 24c. In the embodiment, the lightproof board 24a is securely attached to the axis portion 18. The rotary encoder 24, based on the rotation of the lightproof board 24a associated to the rotation of the axis portion 18, detects either a passage or blockage of light emitted from the light-emitting element 24d by the use of the light-receiving element 24e, and the rotary encoder 24 outputs a pulse signal corresponding to whether there was a passage or blockage of the light emitted from the light-emitting element 24d. By counting the pulse number of this pulse signal, a rotating direction about the axial line 20 and a rotation angle of the joystick 2 are detected.

Figure 4:
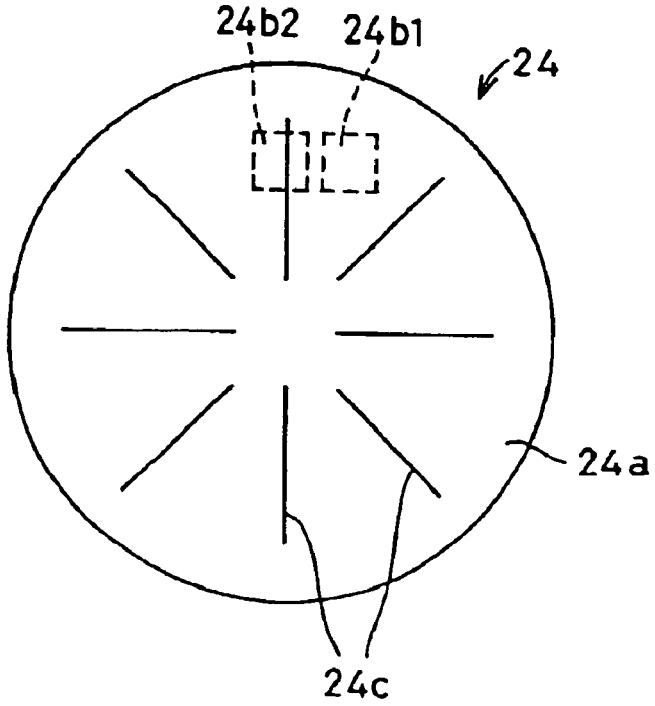
FIG. 4 is a simplified plan view showing a configuration of detecting a rotating direction of the joystick by the use of a rotary encoder.
Figure 5:
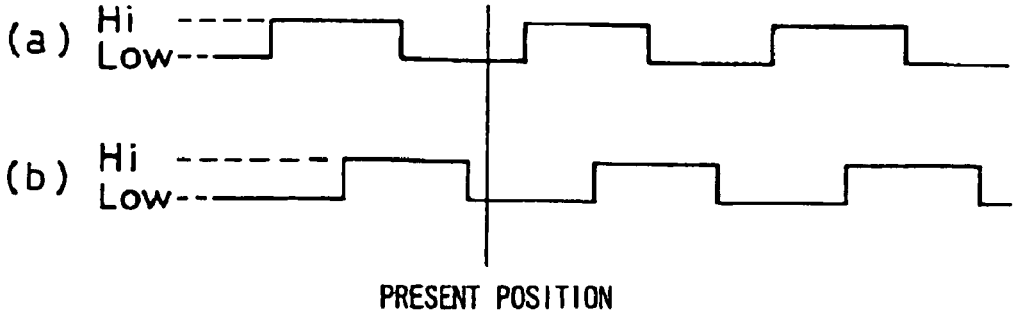
FIG. 5 is a diagram showing an output signal from the rotary encoder.

Next, the detection of a rotating direction of the joystick 2 by the rotary encoder will be described. FIG. 4 is a simplified plan view showing a configuration of detecting a rotating direction of the joystick 2 by the rotary encoder 24. FIG. 5 is a diagram showing an output signal from the rotary encoder 24. FIG. 5(a) shows an output signal of a first photocoupler 24b1, and FIG. 5(b) shows an output signal of a second photocoupler 24b2. For the purpose of detecting a rotating direction of the joystick 2 by the rotary encoder 24, the rotary encoder 24 is provided with the first photocoupler 24b1 and the second photocoupler 24b2. The two photocouplers 24b1, 24b2 are placed in a position where phases of output signals thereof are displaced by 90°, i.e., so that there is a phase difference of 90° between the respective output signals of the two photocopiers.

Detection of a rotating direction of the joystick 2 is performed in the following manner. At first, output signal levels of the two photocouplers 24b1, 24b2 in their present positions are stored, and then it is detected which of the output signal levels of the photocoupler 24b1, 24b2 changes earlier in accordance with the rotation of the joystick 2. As a result, it is possible to identify a rotating direction of the joystick 2. For example, referring to FIGS. 5(a) and 5(b), it is assumed that both the output signal levels of the photocouplers 24b1, 24b2 in their present positions are at a Low level. In a case where the joystick 2 is rotated clockwise in FIG. 4 from the present position, the output signal level of the second photocoupler 24b2 changes to a Hi level, and thereafter the output signal level of the first photocoupler 24b1 changes to the Hi level. Moreover, in a case where the joystick 2 is rotated counterclockwise in FIG. 4 from the present position, the output signal level of the first photocoupler 24b1 changes to the Hi level, and thereafter, the output signal level of the second photocoupler 24b2 changes to the Hi level. In these cases, by detecting that the output signal level of the second photocoupler 24b2 changes from the Low level to the Hi level earlier than the output signal level of the first photocoupler 24b1, it is possible to identify that the joystick 2 is rotated clockwise. Moreover, by detecting that the output signal level of the first photocoupler 24b1 changes from the Low level to the Hi level earlier than the output signal level of the second photocoupler 24b2, it is possible to identify that the joystick 2 is rotated counterclockwise.

The lean detecting section 12 is constituted by a plurality of (eight in the embodiment) limit switches 25a to 25h which are placed at the same radial distance from the axial line 20 in leaning directions of the joystick 2 (arrows 22a to 22h), for example, and when each of the limit switches 25a to 25h is pressed, a leaning direction of the joystick 2 is thereby detected.

The press detecting section 13 is constituted by, for example, a spring returning limit switch 26, by which a pressing motion in the pressing direction 23 (rightward in FIG. 2) of the joystick 2 is detected.

As described above, the navigation apparatus 1 of the embodiment is equipped with the joystick 2 which is capable of three motions of a rotating motion, a leaning motion and a pressing motion, so that the joystick 2 can be provided with more operations of navigation functions than in a navigation apparatus having a joystick capable of only two motions of the prior art navigation apparatus. Therefore, the number of switches on the operation panel section 4 can be less than in the prior art navigation apparatus. Furthermore, the frequency of checking a position of a switch when the user performs a navigation function is decreased, and user inconvenience is thereby eliminated.

Referring to FIG. 1 again, basic map data that is read out from the map-only disc 6 by the CD-ROM drive 8 and the amount of user operation data of the joystick 2 that is detected by the operation detecting section 10 are inputted into the map drawing section 9. The map drawing section 9, based on the respective inputted data, produces adjusted map data which are adjusted to a scale and rotating position of the user's request, and the map drawing section 9 outputs this produced adjusted map data to the video RAM 14.

The video RAM 14 is a so-called buffer memory, and the video RAM 14 temporarily stores the inputted adjusted map data. The image converting section 15 reads out the adjusted data stored in the video RAM 14, and coverts this to image data to be output to the display 3. Based on the inputted image data, the display 3 displays a map which is adjusted to a scale and rotating position of the user's request.

Figure 6:
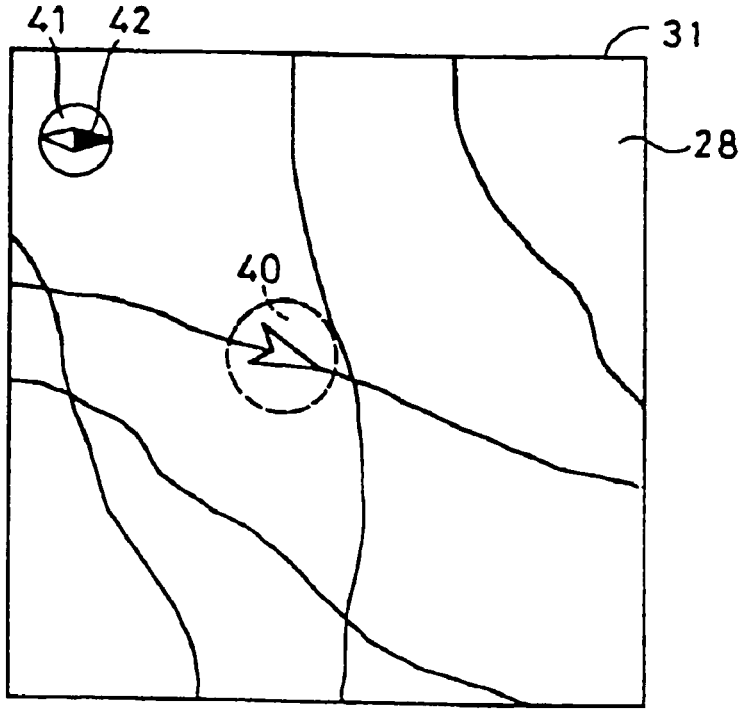
FIG. 6 is a diagram showing a state where a road map is displayed on a display screen of a display.
Figure 7:
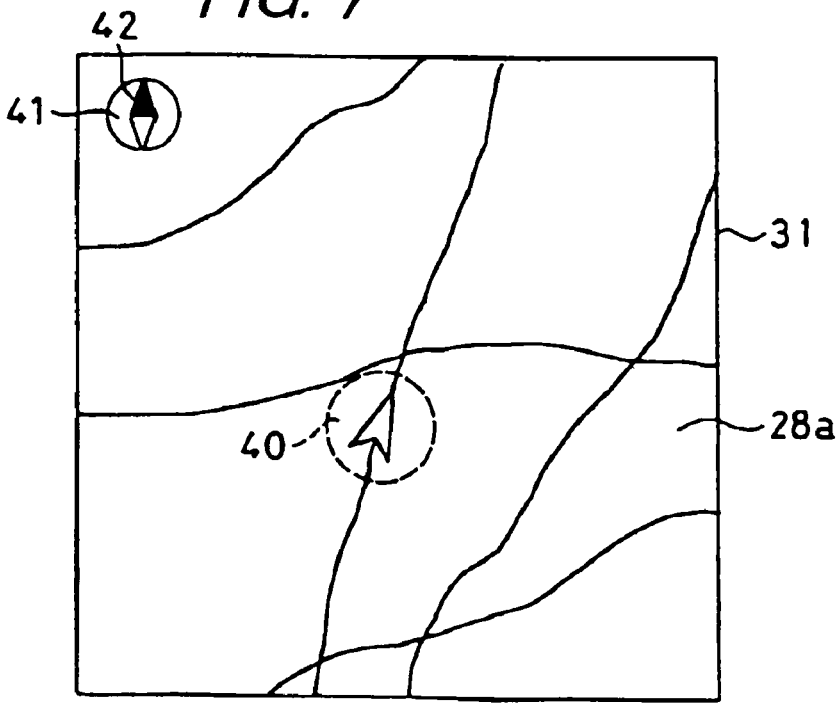
FIG. 7 is a diagram showing a road map obtained by rotating the road map of FIG. 6 by 90° in a counterclockwise direction.
Figure 8:
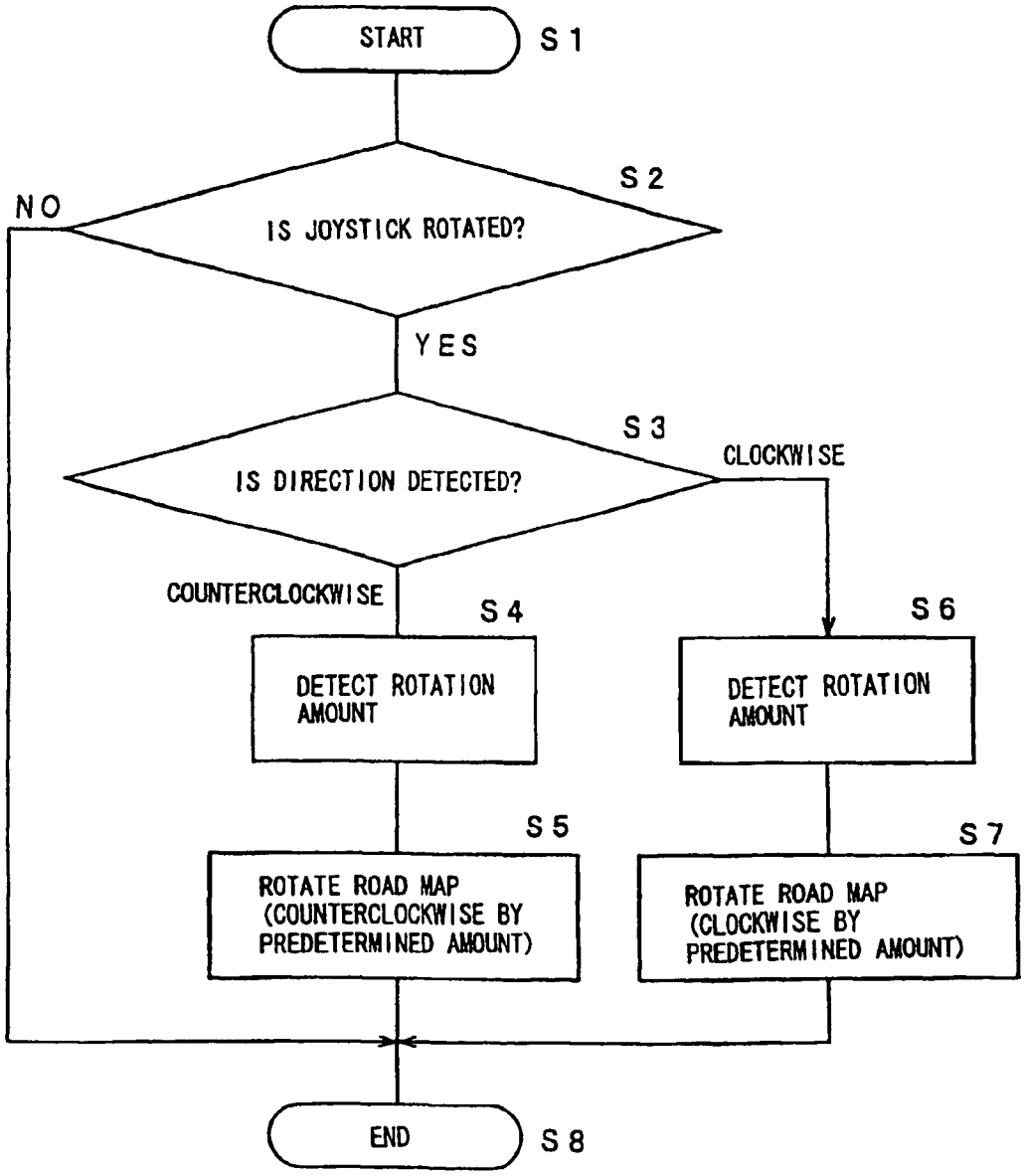
FIG. 8 is a flowchart for explaining a motion of rotating the road map.

FIG. 6 is a diagram showing a state where a road map 28 is displayed on a display screen 31 of the display 3. FIG. 7 is a diagram showing a road map 28a that is obtained by rotating the road map 28 of FIG. 6 by 90° in the counterclockwise direction. FIG. 8 is a flowchart for explaining a motion of rotating the road map 28. The navigation apparatus 1 of the embodiment is capable of displaying the road map 28 on the display screen 31. This displayed road map 28 can be displayed while it is being rotated about an axial line that is perpendicular to the display screen 31. A motion of rotating this road map 28 can be performed only by an operation of the joystick 2. On the display screen 31, a vehicle icon 40 which indicates an orientation and present position of a vehicle and a compass icon 41 which indicates a direction on the road map 28 are additionally displayed.

In a state where the road map 28 is displayed on the display screen 31, by rotating the joystick 2 about the axial line 20, it is possible to rotate the road map 28 displayed on the display screen 31. At this moment, a rotating direction of the joystick 2 from the view of the user matches with a rotating direction of the road map 28. In other words, when the user rotates the joystick 2 about the axial line 20 in the clockwise (the arrow 21b) direction, the road map 28 on the display screen 31 is thereby rotated in the clockwise direction from the view of the user in the state of keeping a relative positional relation with the vehicle icon 40. Moreover, when the user rotates the joystick 2 about the axial line 20 in the counterclockwise (the arrow 21a) direction, the road map 28 on the display screen 31 is thereby rotated in the counterclockwise direction from the view of the user in the state of keeping a relative positional relation with the vehicle icon 40. Although the compass icon 41 itself does not rotate by a motion of rotating the joystick 2, a magnetic needle 42 rotates in conjunction with the rotation of the road map 28. In such a configuration, a correspondence between an operation of the joystick 2 and a rotating direction of the road map 28 on the display screen 31 is achieved, whereby a sense of incompatibility as in the prior art is eliminated.

Referring to FIG. 8, a flowchart for explaining a motion of rotating the road map 28 will be described. The motion of rotating the map begins in step s1, and in step s2, it is judged whether a rotation of the joystick 2 about the axial line 20 is detected by the rotary encoder 24. When rotation of the joystick 2 about the axial line 20 is detected, a direction of the rotation is determined in step s3. When the rotating direction is determined to be counterclockwise in step s3, a rotation amount of the joystick 2 is detected in step s4. Subsequently, in step s5, the road map 28 is rotated counterclockwise on the display screen 31 by a predetermined rotation amount that corresponds to the detected rotation amount, and the motion of rotating the map 28 ends in step s8. When the rotation direction is determined to be clockwise in step s3, a rotation amount of the joystick 2 is detected in step s6. Subsequently, in step s7, the road map 28 is rotated clockwise on the display screen 31 by a predetermined rotation amount that corresponds to the detected rotation amount, and the motion of rotating the map ends in step s8. In a case where rotation of the joystick 2 about the axial line 20 is not detected at step s2, the motion of rotating the map ends in step s8.

Furthermore, a rotation amount of the road map 28 on the display screen 31 corresponds to a rotation amount of the joystick 2. As described above, a rotation amount of the joystick 2 is detected by the rotation detecting section 11. For example, the rotation amount of the joystick 2 is derived by determining the pulse number of the rotary encoder 24. In response to this rotation amount of the joystick 2, a rotation amount of the road map 28 on the display screen 31 is decided. More specifically, an amount obtained by multiplying a rotation amount that is detected by the rotation detecting section 11 and a unit dot of map drawing is a rotation amount of the road map 28 on the display screen 31. The road map 28 is rotated by this rotation amount. For example, when the joystick 2 is rotated by 90° in the counterclockwise (the arrow 21a) direction about the axial line 20 in the state shown in FIG. 6, the road map 28a rotated by 90° in the counterclockwise direction shown in FIG. 7 is displayed on the display screen 31.

Figure 9:
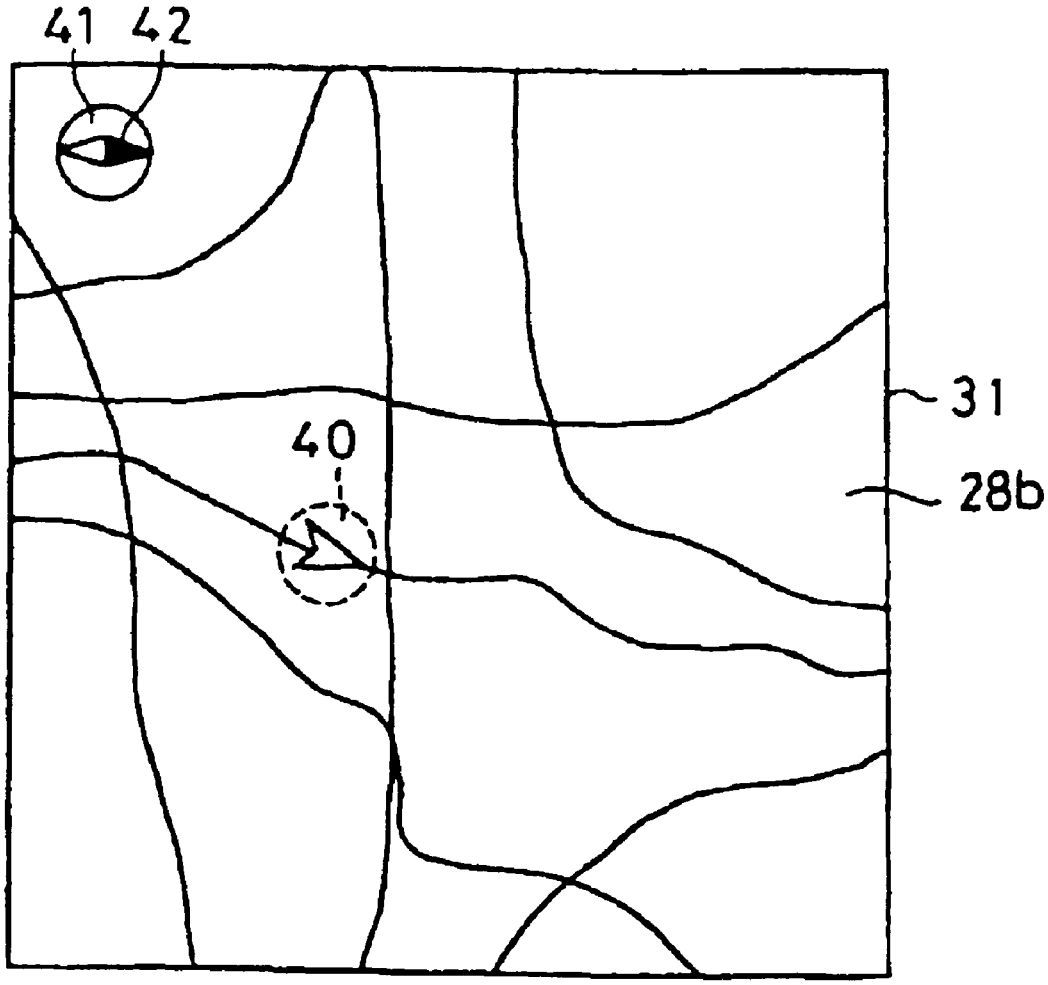
FIG. 9 is a diagram showing a road map obtained by scaling down the road map of FIG. 6.
Figure 10:
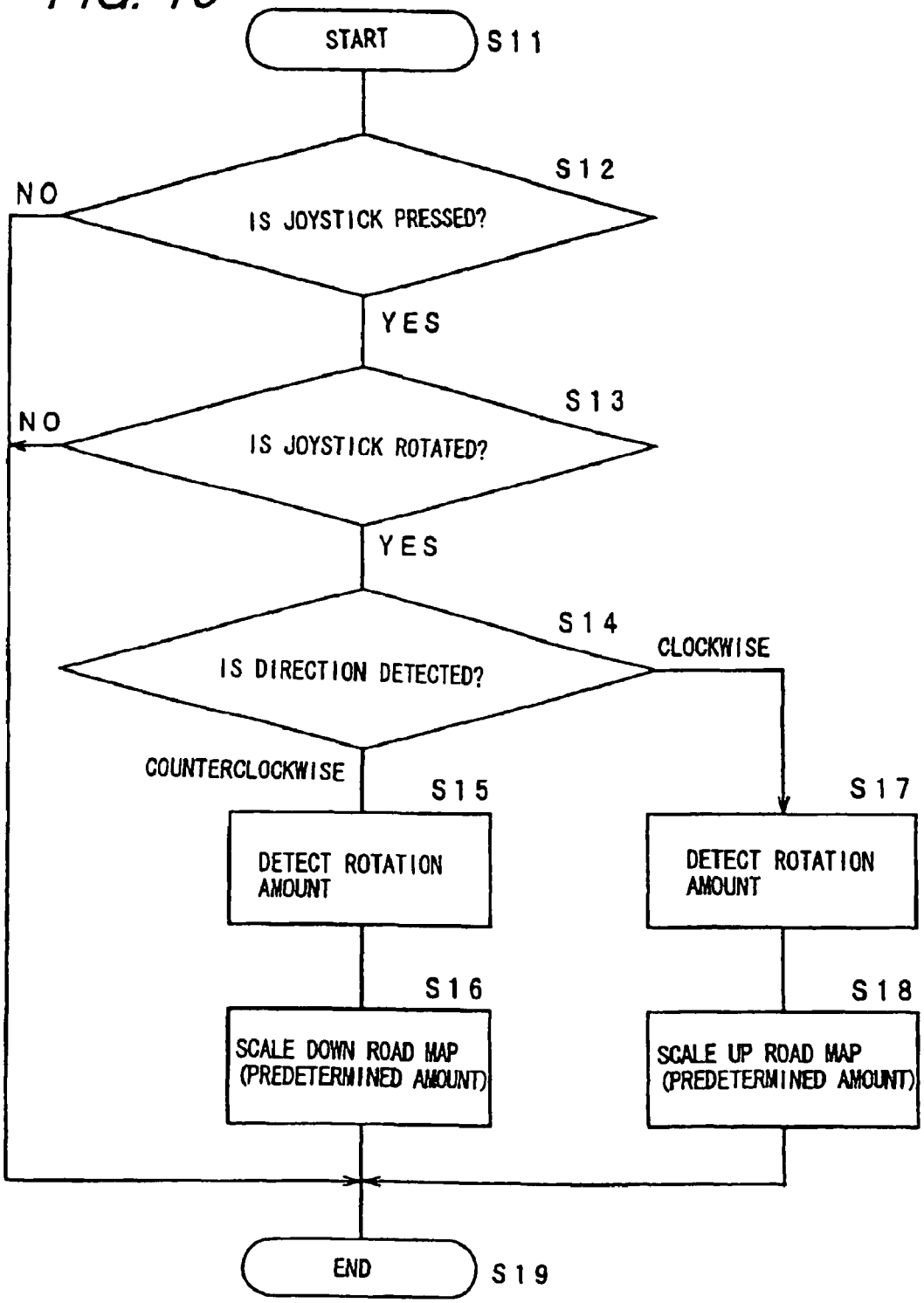
FIG. 10 is a flowchart for explaining a motion of changing a scale of a road map.

FIG. 9 is a diagram showing a road map obtained by scaling down the road map of FIG. 6. FIG. 10 is a flowchart for explaining a motion of changing a scale of a road map. Moreover, in the navigation apparatus 1 of the embodiment, it is possible to change the scale of the road map 28 that is displayed on the display screen 31, and it is possible only by an operation of the joystick 2 to perform this change of the scale of the road map 28.

Referring to FIG. 10, a motion of changing the scale of the road map 28 will be described. The motion of changing the scale of the road map 28 begins in step s11, and when it is detected by the limit switch 26 in step s12 that the joystick 2 is pressed (depressed) in the direction of the axial line 20 and it is detected by the rotary encoder 24 in step s13 that the joystick 2 is rotated about the axial line 20, a rotating direction of the joystick 2 about the axial line 20 is determined in step s14. When the rotating direction is determined to be counterclockwise in step s14, a rotation amount of the joystick 2 is detected in step s15. Subsequently, in step s16, a scale amount is changed so as to scale down the road map 28 on the display screen 31 by a predetermined amount corresponding to the detected rotation amount, and the motion of changing the scale of the road map 28 ends in step s19. When the rotating direction is determined to be clockwise in step s14, a rotation amount of the joystick 2 is detected in step s17. Subsequently, in step s18, a scale amount is changed so as to scale up the road map 28 on the display screen 31 by a predetermined amount corresponding to the detected rotation amount, and the motion of changing the scale of the road map 28 ends in step s19. In a case where, in step s12, a press of the joystick 2 in the direction of the axial line 20 is not detected and rotation of the joystick 2 about the axial line 20 is not detected, the motion of changing the scale of the road map 28 ends in step s19.

In a state where the road map 28 is displayed on the display screen 31, by rotating the joystick 2 about the axial line 20 while pressing the joystick 2 in the direction of the arrow 23 (the pressing motion), it is possible to change the scale of the road map 28 that is displayed on the display screen 31. At this moment, in a case where the user rotates the joystick 2 about the axial line 20 in the clockwise (the arrow 21b) direction while pressing the joystick 2, the road map 28 on the display screen 31 is thereby displayed larger than it was previously displayed. Moreover, in a case where the user rotates the joystick 2 about the axial line 20 in the counterclockwise (the arrow 21a) direction while pressing the joystick 2, the road map 28 on the display screen 31 is thereby displayed smaller than it was previously displayed. Furthermore, a scale amount of the road map 28 on the display screen 31 corresponds to a rotation amount of the joystick 2.

For example, when the joystick 2 is rotated about the axial line 20 in the counterclockwise (the arrow 21a) direction while being pressed in the state shown in FIG. 6, the scaled-down road map 28b shown in FIG. 9 is displayed on the display screen 31.

Figure 11:
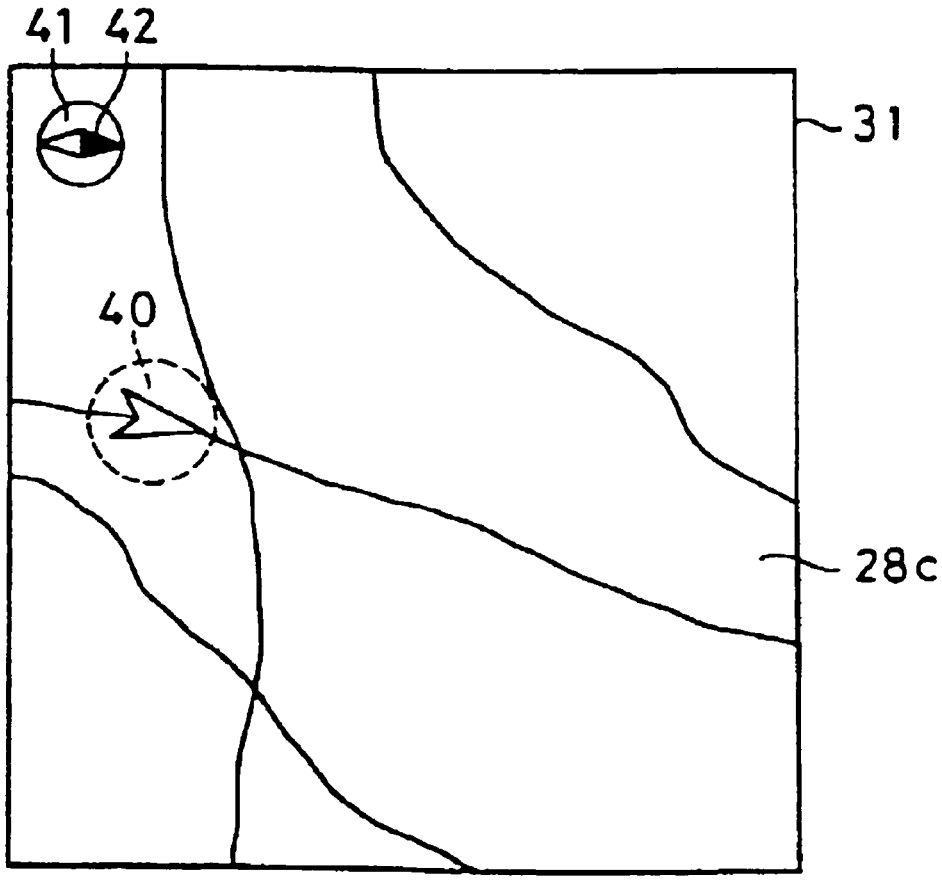
FIG. 11 is a diagram showing a road map obtained by scrolling the road map of FIG. 6.
Figure 12:
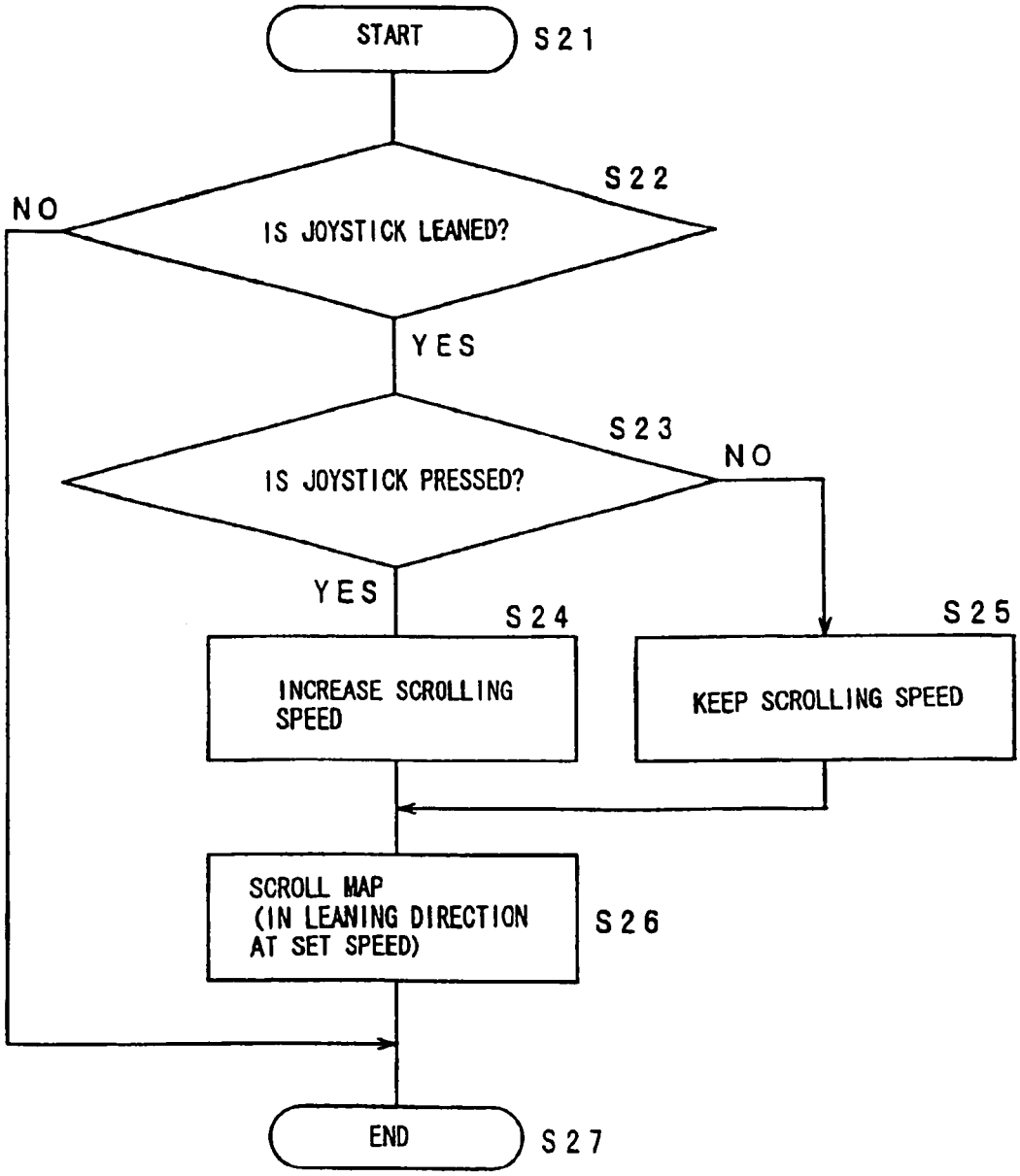
FIG. 12 is a flowchart for explaining a motion of scrolling a road map.

FIG. 11 is a diagram showing a road map that is obtained by scrolling the road map of FIG. 6. FIG. 12 is a flowchart for explaining a motion of scrolling a road map. In the navigation apparatus 1 of the embodiment, it is possible to scroll the road map 28 displayed on the display screen 31, and it is possible only by an operation of the joystick 2 to perform this scrolling of the road map 28.

Referring to FIG. 12, a motion of scrolling a road map will be described. In step s21, the motion of scrolling the road map 28 begins, and in a case where a lean of the joystick 2 is detected by the limit switches 25a to 25h in step s22 and a press (depress) of the joystick 2 in the direction of the axial line 20 is detected by the limit switch 26 in step s23, where the pressing of the joystick 2 operates so as to increase a speed of scrolling a road map, the scrolling speed is changed in step s24. Moreover, in a case where a press of the joystick 2 in the direction of the axial line 20 is not detected by the limit switch 26 in step s23, a speed of scrolling a road map is kept as slow as an initial setting in step s25. Subsequently, in step s26, the road map 28 on the display screen 31 is scrolled in a leaning direction of the joystick 2 at a set scrolling speed, and the motion of scrolling the road map 28 ends in step s27. In a case where a lean of the joystick 2 is not detected in step s22, the motion of scrolling the road map 28 ends in step s27.

In a state where the road map 28 is displayed on the display screen 31, by leaning the joystick 2, it is possible to scroll the road map 28 on the display screen 31. At this moment, a leaning direction of the joystick 2 from the view of the user matches with a scrolling direction of the road map 28. In other words, when the user leans the joystick 2 in the direction of the arrow 22b, the road map 28 on the display screen 31 scrolls upward from the view of the user, and when the user leans the joystick 2 in the direction of the arrow 22f, the road map 28 on the display screen 31 scrolls downward from the view of the user. For example, when the joystick 2 is leaned to the left (the arrow 22a) from the view of the user in a state where the road map 28 of FIG. 6 is displayed, a road map 28c obtained by scrolling leftward from the view of the user is displayed on the display screen 31, as shown in FIG. 11.

In addition, by pressing (depressing) the joystick 2 in the direction of the arrow 23 in the middle of leaning the joystick 2 and scrolling the road map 28 on the display screen 31, it is possible to change a speed of scrolling the road map 28. Although a speed of scrolling the road map 28 may be decreased by pressing the joystick 2, it is preferable to increase the scrolling speed. By increasing the scrolling speed, it is possible to display a road map 28 of a destination faster, whereby usability increases.

Figure 13:
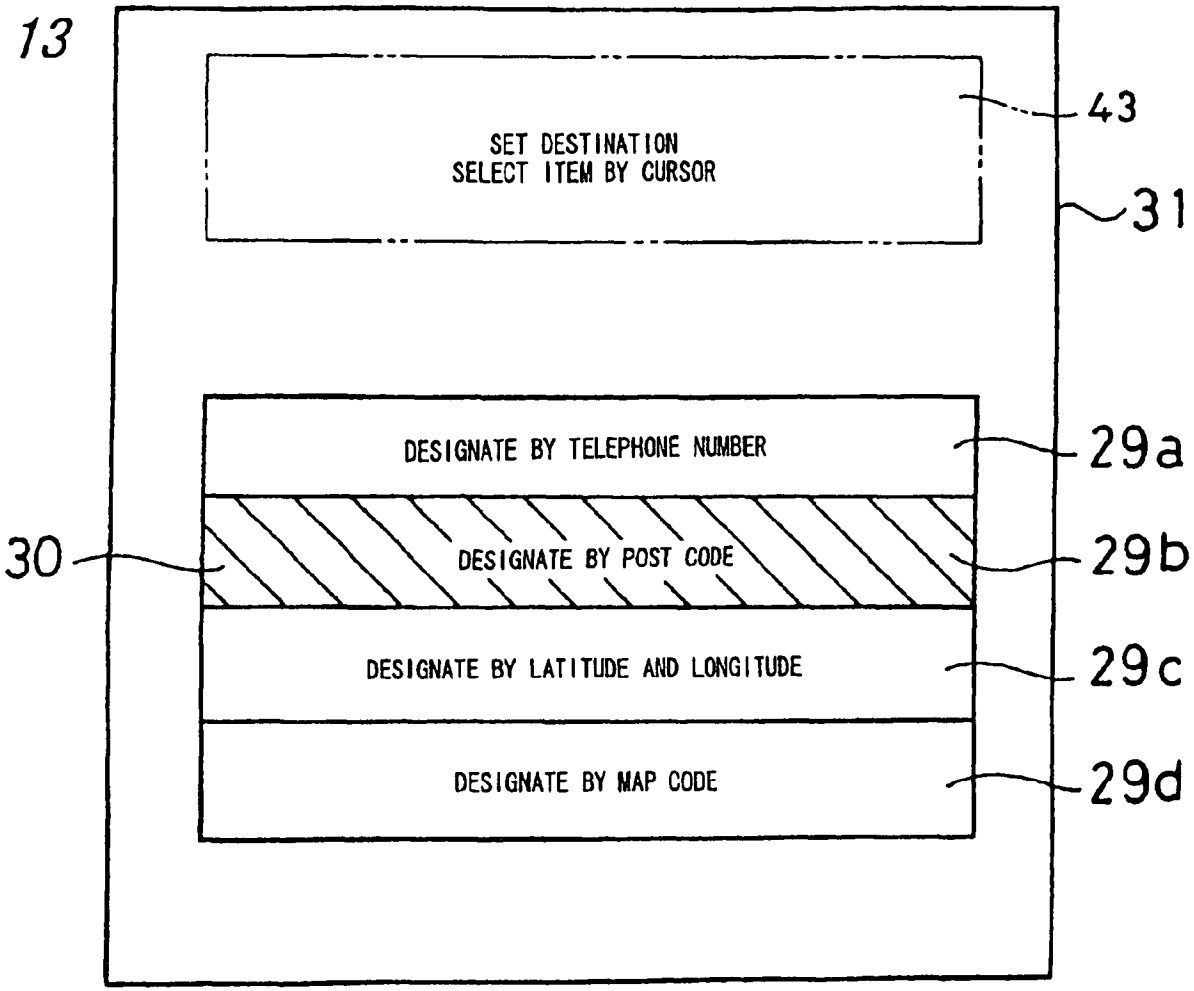
FIG. 13 is a diagram showing the display screen at a time of selecting and performing a navigation function.
Figure 14:
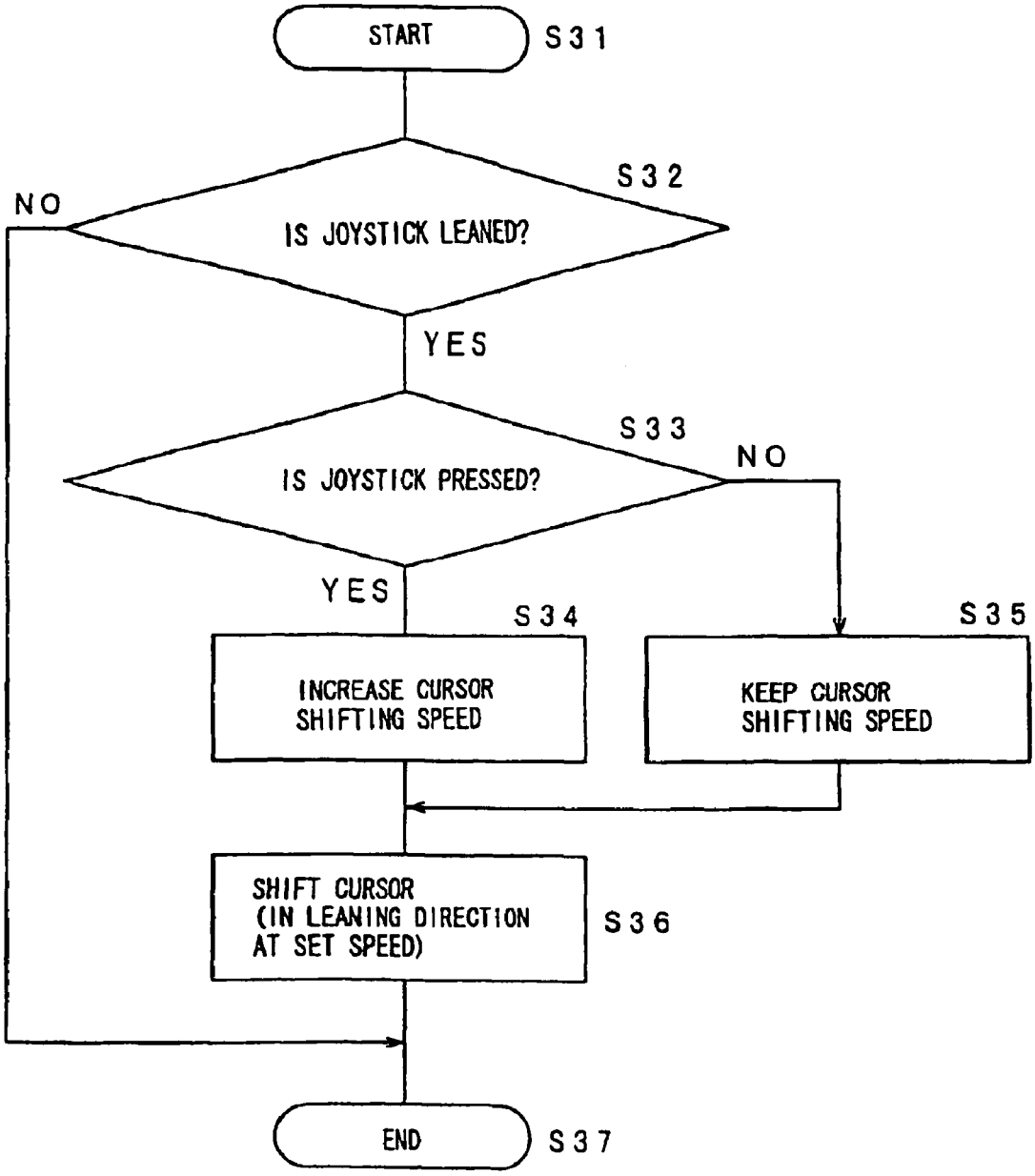
FIG. 14 is a flowchart for explaining a motion of shifting a cursor.

Furthermore, the navigation apparatus 1 of the embodiment has a plurality of navigation functions. FIG. 13 is a diagram showing the display screen 31 at the time of selecting and performing the respective navigation functions. FIG. 14 is a flowchart for explaining a motion of shifting a cursor. On the display screen 31, a plurality of icons 29a to 29d which indicate items for performing the respective navigation functions and designating means such as a cursor 30 or a pointer for designating these icons 29a to 29d to perform their respective functions are displayed. In addition, a sentence 43 which encourages selection of a title and item of a navigation function is displayed on the display screen 31. A motion of this displayed cursor 30 can be performed only by an operation of the joystick 2. Here, in FIG. 13, a chain double-dashed line displayed around the sentence 43 for a convenient description, but such chain double-dashed line is not actually displayed on the display screen 31.

Referring to FIG. 14, a motion of shifting the cursor will be described. In step s31, the motion of shifting the cursor is started, and when a lean of the joystick 2 is detected by the limit switches 25a to 25h in step s32 and a press (depress) of the joystick 2 in the direction of the axial line 20 is detected by the limit switch 26 in step s33, where pressing the joystick operates so as to increase the shifting speed of the cursor 30, a cursor shifting speed the cursor 30 is increased in step s34. Moreover, in a case where a press of the joystick 2 in the direction of the axial line 20 is not detected by the limit switch 26 in step s33, a cursor shifting speed is kept as slow as an initial setting of the cursor shifting speed in step s35. Subsequently, in step s36, the cursor 30 on the display screen 31 is shifted in the leaning direction of the joystick 2 at a set cursor shifting speed, and the motion of shifting the cursor ends in step s37. In a case where a lean of the joystick 2 is not detected in step s32, the motion of shifting the cursor ends in step s37.

In a state where the cursor 30 is displayed on the display screen 31, by leaning the joystick 2, it is possible to shift the cursor 30 on the display screen 31. At this moment, a leaning direction of the joystick 2 from the view of the user matches with a shifting direction of the cursor 30. In other words, when the user leans the joystick 2 in the direction of the arrow 22b, the cursor 30 on the display screen 31 shifts upward from the view of the user. For example, in the example shown in FIG. 13, the cursor 30 shifts to the icon 29a above the icon 29b. Moreover, when the user leans the joystick 2 in the direction of the arrow 22f, the cursor 30 on the display screen 31 shifts downward from the view of the user. For example, in the example shown in FIG. 13, the cursor 30 shifts to the icon 29c below the icon 29b.

Besides, by pressing (depressing) the joystick 2 in the direction of the arrow 23 in the middle of leaning the joystick 2 and shifting the cursor 30 on the display screen 31, it is possible to change a shifting speed of the cursor 30. Although a shifting speed of the cursor 30 may be decreased by pressing the joystick 2, it is preferable to increase the shifting speed. By increasing a shifting speed of the cursor 30 as described above, it is possible to make the cursor 30 reach an icon of an aimed item faster, whereby usability increases.

Figure 15:
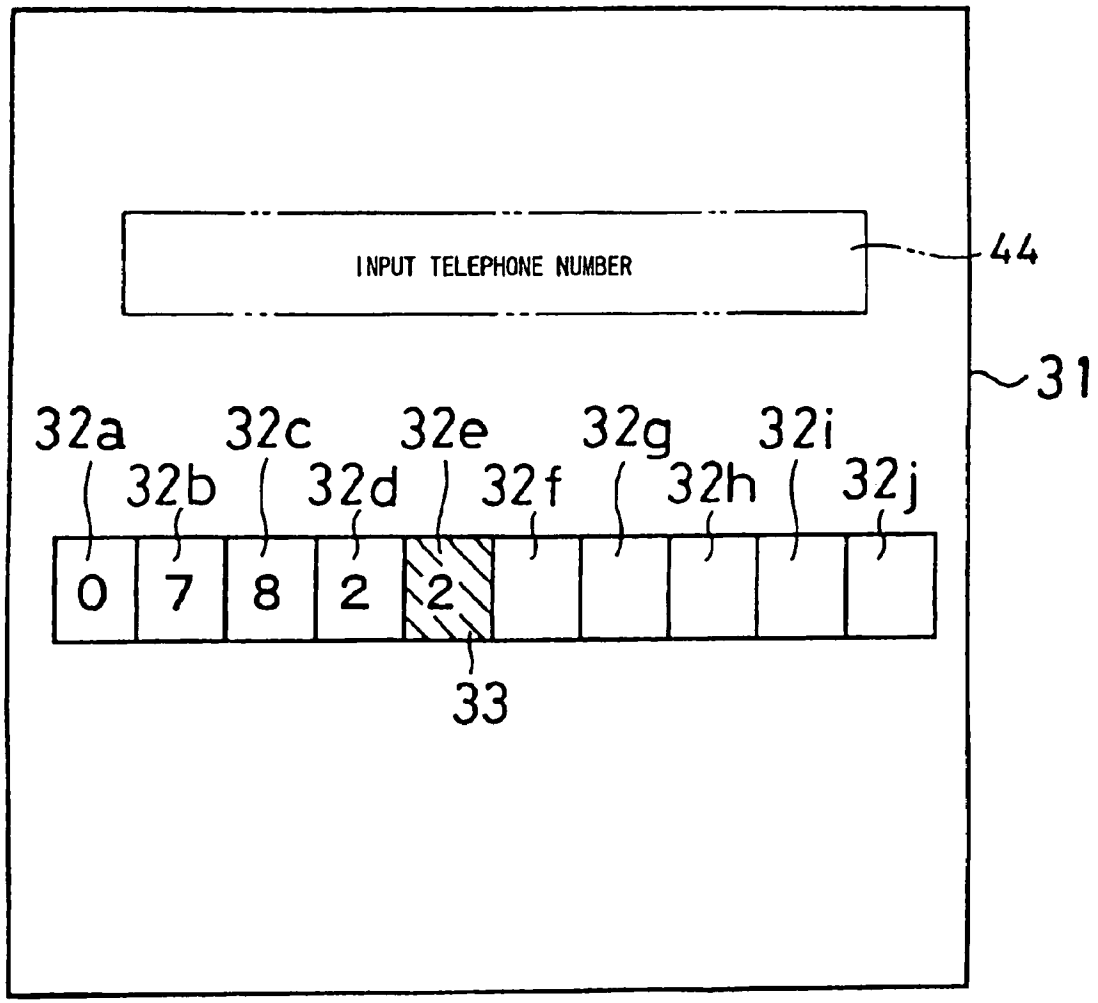
FIG. 15 is a diagram showing the display screen at a time of inputting a telephone number.
Figure 16:
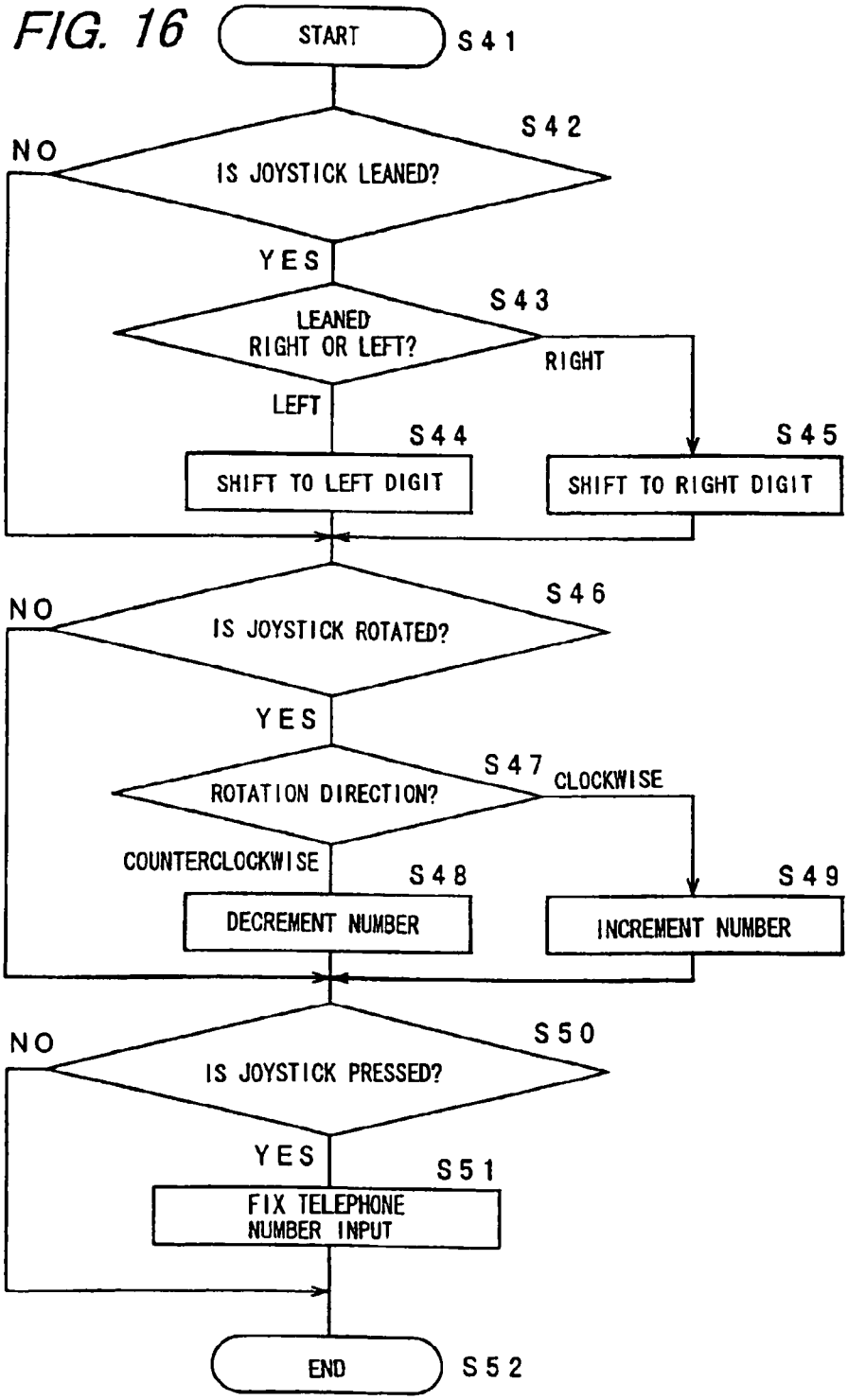
FIG. 16 is a flowchart for explaining a motion of inputting a telephone number.

Furthermore, the navigation apparatus 1 of the invention has a function of searching the best route to a destination on the basis of a telephone number, post code and latitude and longitude information of a destination, and map code (trademark), which is encoded position data of a specific place. Also regarding numerical data of the telephone number, post code, latitude and longitude information, map code and so on, it is possible to input this information only by an operation of the joystick 2 that is capable of the three above-described motions. FIG. 15 is a diagram showing the display screen 31 at the time of inputting a telephone number. FIG. 16 is a flowchart for explaining a motion of inputting a telephone number.

On the display screen 31, for example, a plurality of blocks 32a to 32j which correspond to individual digits of a telephone number and a cursor 33 which represents a state of allowing an input are displayed. On the display screen 31, a sentence 44 which encourages the input of numerical data corresponding to an item selected on the display screen 31 of FIG. 13 is displayed. Here, in FIG. 15, a chain double-dashed line is displayed around the sentence 44 for a convenient description, but such chain doubled-dashed line is not actually displayed on the display screen 31.

Referring to FIG. 16, a motion of inputting a telephone number will be described. In step s41, the motion of inputting a telephone number begins, and when a lean of the joystick 2 is detected by the limit switches 25a to 25h in step s42, it is determined at step s43 whether a leaning direction is rightward or leftward. When a lean of the joystick 2 is leftward, the cursor 33 on the display screen 31 shifts to a block which corresponds to a digit to the left of a digit where the cursor presently exists in step s44. Moreover, when a lean of the joystick 2 is rightward, the cursor 33 on the display screen 31 shifts to a block which corresponds to a digit to the right of a digit where the cursor presently exists in step s45.

When a lean of the joystick 2 is not detected in step s42, or after the cursor 33 shifts in steps s44 and s45, it is determined in step s46 whether rotation of the joystick 2 about the axial line 20 is detected by the rotary encoder 24. When rotation of the joystick 2 is detected, a rotating direction of the joystick 2 is determined in step s47. When the rotation direction is determined to be counterclockwise in step s47, a number displayed in the block 32 where the cursor 33 exists is decremented in step s48. Moreover, when the rotating direction is determined to be counterclockwise, a number displayed in the block 32 where the cursor 33 exists is incremented in step 549.

In a case where a press (depress) of the joystick 2 in the direction of the axial line 20 is detected by the limit switch 26 in step s50 when a rotation of the joystick 2 is not detected in step s46, or after a number is decremented or incremented in steps s48, s49, respectively, the input of a telephone number is fixed in step s51, and the motion of inputting a telephone number ends in step s52.

In a state where the individual blocks 32 and the cursor 33 are displayed in this manner, by rotating the joystick 2 about the axial line 20, it is possible to increment and decrement a number on the cursor 33 between 0 and 9. At this moment, each time when the user rotates the joystick 2 by 36° about the axial line 20 in the clockwise (the arrow 21b) direction, a number obtained by incrementing the displayed number by one is displayed. Moreover, each time when the user rotates the joystick 2 by 36° about the axial line 20 in the counterclockwise (the arrow 21a) direction, a number obtained by decrementing the displayed number by one is displayed. In a case where the joystick 2 is rotated clockwise about the axial line 20 when a number on the cursor 33 is '9', a process of incrementing the displayed number by one is not performed, and '9' remains displayed or '0' is displayed. Moreover, in a case where the joystick 2 is rotated counterclockwise about the axial line 20 when a number on the cursor 33 is '0', a process of decrementing the displayed number by one is not performed, and '0' remains displayed or '9' is displayed.

Furthermore, by leaning the joystick 2 at the time of inputting a telephone number, it is possible to shift the digit of the cursor 33. At this moment, a leaning direction of the joystick 2 matches with a shifting direction of the cursor 33. For example, when the joystick 2 is leaned to the right from the view of the user (a direction of the arrow 22h), the cursor 33 shifts to the block 32f on the right side from the view of the user. Moreover, when the joystick 2 is leaned to the left from the view of the user (a direction of the arrow 22d), the cursor 33 shifts to the block 32d on the left side from the view of the user. In a case where the joystick 2 is leaned further leftward when the cursor 33 exists on the leftmost block 32a, the cursor 33 remains on the block 32a or shifts to the block 32j. Moreover, in a case where the joystick 2 is leaned further rightward when the cursor 33 exists on the rightmost block 32j, the cursor 33 remains on the block 32j or shifts to the block 32a.

After combining the operations of leaning and rotating the joystick 2 described above and ending the input of a telephone number, by pressing (depressing) the joystick 2 in the pressing direction 23, the inputted telephone number is fixed. When a telephone number is fixed in this manner, a route to a destination of this telephone number is searched for.

As described above, an operation of changing a number on each digit of numerical data such as a telephone number, a post code, latitude and longitude information and a map code, an operation of shifting a digit of the cursor 33, and an operation of fixing the inputted numerical data can be performed only by an operation of the joystick 2, which results in an increased operation speed. Furthermore, when inputting a number of each digit, it is not necessary to perform a pressing operation as required in the prior art, whereby it is possible to prevent a misoperation of leaning a joystick by mistake while inputting a number and thereby shifting a cursor to another digit.

The present invention may be embodied in other specific forms without departing from the spirit or essential characteristics thereof. The present embodiments are therefore to be considered in all respects as illustrative and not restrictive. Further, the scope of the present invention is indicated by the appended claims rather than by the foregoing description, and all changes which come within the meaning and the range of equivalency of the claims are therefore intended to be embraced therein.

According to the present invention, a joystick which is capable of the three motions of leaning in a plurality of predetermined directions, rotating about an axial line and being pressed (depressed) in the direction of the axial line is disclosed. Accordingly, it is possible to provide operations of this joystick with a lot of navigation functions, and, as compared with the prior art, it is possible to decrease the number of switches of a remote controller and an operation panel section.

Further, according to the present invention, by rotating the joystick about the axial line of the joystick, a map displayed on display means rotates so that it is possible to eliminate a sense of incompatibility in an operation of rotating a map.

Still further, according to the present invention, the joystick is provided with an operation of changing a scale of a map so that there is no need to touch another operation device (e.g., a switch) other than the joystick.

Still further, according to the present invention, it is possible, only by an operation of the joystick to scroll a map and change a scrolling speed of a map so that user-friendliness increases.

Still further, according to the present invention, only by an operation of the joystick, the user can shift designating means for designating an item which indicates each navigation function, and can change a shifting speed of the designating means. As a result, user-friendliness increases.

Still further, according to the present invention, it is possible, by the use of a single joystick, to perform an operation of changing a number of each digit of numerical data such as a telephone number, a post code, latitude and longitude information or position information, an operation of shifting a digit, and an operation of fixing the numerical data so that user-friendliness and, especially, an inputting speed increases. Moreover, when inputting a number of each digit, it is not necessary to perform a pressing operation, and as a result it is possible to prevent a misoperation of leaning the joystick by mistake while inputting numbers and thereby shifting a cursor to another digit.

What is claimed is:

1. A navigation apparatus mounted in a vehicle, said apparatus comprising:

a display;

a joystick adapted to being leaned in a plurality of predetermined directions, rotated about a longitudinal axial line of said joystick, and depressed in a direction along the axial line; and

[control means for changing] *a controller configured to change* a display state of said display according to a motion of said joystick.

2. The navigation apparatus of claim 1, wherein a map is displayed on said display, and said [control means] *controller* rotates the map when said joystick is rotated about the axial line.

3. The navigation apparatus of claim 1, wherein a map is displayed on said display, and said [control means] *controller* changes a scale of the map when said joystick is rotated about the axial line while being depressed in the direction of the axial line.

4. The navigation apparatus of claim 3, wherein said [control means] *controller* increases a displayed scale of the map when said joystick is rotated to one side about the axial line while being depressed in the direction of the axial line, and decreases a displayed scale of the map when said joystick is rotated to the other side about the axial line while being depressed in the direction of the axial line.

5. The navigation apparatus of claim 1, wherein a map is displayed on said display; and said [control means] *controller* scrolls the map when said joystick is leaned, and changes a scrolling speed of the map when said joystick is pressed in the direction of the axial line while being leaned.

6. The navigation apparatus of claim 1, further comprising [designating means for selecting and designating] *a selecting and designating unit configured to select and designate* a navigation function from among a plurality of predetermined navigation functions, wherein:

items corresponding to the navigation functions and said [designating means] *selecting and designating unit* are displayed on said display; and said [control means] *controller* shifts said [designating means] *selecting and designating unit* when said joystick is leaned, and changes a shifting speed of said [designating means] *selecting and designating unit* when said joystick is depressed in the direction of the axial line while being leaned.

7. The navigation apparatus of claim 1, further comprising [data inputting means for inputting] *an input unit configured to input* numerical data, wherein:

a cursor for designating and inputting the numerical data is displayed on said display; and said [control means] *controller* increments and decrements a number designated by the cursor when said joystick is rotated about the axial line, shifts a digit designated by the cursor when said joystick is leaned, and fixes inputted numerical data when said joystick is depressed in the direction of the axial line.

8. The navigation apparatus of claim 7, wherein the numerical data is a telephone number.

9. The navigation apparatus of claim 7, wherein the numerical data is a post code.

10. The navigation apparatus of claim 7, wherein the numerical data is latitude and longitude information.

11. The navigation apparatus of claim 7, wherein the numerical data is position information, which is encoded position data of a specific location.

12. The navigation apparatus of claim 7, wherein said [control means] *controller* increments a number designated by the cursor when said joystick is rotated to one side about the axial line, and decrements a number designated by the cursor when said joystick is rotated to the other side about the axial line.

13. The navigation apparatus of claim 1, wherein said [control means] *controller* comprises an operation detector for detecting each motion of said joystick.

14. The navigation apparatus of claim 13, wherein said operation detector comprises a rotation detector for detecting when said joystick is rotated about the axial line, a lean detector for detecting when said joystick is leaned, and a press detector for detecting when said joystick is depressed in the direction of the axial line.

15. The navigation apparatus of claim 14, wherein said rotation detector comprises a rotary encoder including a plurality of photocouplers for detecting a rotation angle of said joystick.

16. The navigation apparatus of claim 14, wherein said lean detector comprises a plurality of switches for detecting when said joystick is leaned in one of the plurality of predetermined directions.

17. The navigation apparatus of claim 14, wherein said press detector comprises a spring switch for detecting when said joystick is depressed in the direction of the axial line.

18. A navigation apparatus mounted in a vehicle, said apparatus comprising:

a display unit;

a joystick adapted to being leaned in a plurality of predetermined directions, rotated about a longitudinal axial line of said joystick, and depressed in a direction along the axial line; and a control unit operable to change a display state of said display unit according to a motion of said joystick.

19. The navigation apparatus of claim 18, wherein a map is displayed on said display unit, and said control unit is operable to rotate the map when said joystick is rotated about the axial line.

20. The navigation apparatus of claim 18, wherein a map is displayed on said display unit, and said control unit is operable to change a scale of the map when said joystick is rotated about the axial line while being depressed in the direction of the axial line.

21. The navigation apparatus of claim 20, wherein said control unit is operable to increase a displayed scale of the map when said joystick is rotated to one side about the axial line while being depressed in the direction of the axial line, and to decrease a displayed scale of the map when said joystick is rotated to the other side about the axial line while being depressed in the direction of the axial line.

22. The navigation apparatus of claim 18, wherein a map is displayed on said display unit, and said control unit is operable to scroll the map when said joystick is leaned, and to change a scrolling speed of the map when said joystick is depressed in the direction of the axial line while being leaned.

23. The navigation apparatus of claim 18, further comprising a designator operable to select and designate a navigation function from among a plurality of predetermined navigation functions, wherein:

items corresponding to the navigation functions and said designator are displayed on said display unit; and said control unit is operable to shift said designator when sad joystick is leaned, and to change a shifting speed of said designator when said joystick is depressed in the direction of the axial line while being leaned.

24. The navigation apparatus of claim 18, further comprising a data inputting device operable to input numerical data, wherein:

a cursor is displayed on said display unit; and said control unit is operable to increment and decrement a number designated by the cursor when said joystick is rotated about the axial line, to shift a digit designated by the cursor when said joystick is leaned, and to fix inputted numerical data when said joystick is depressed in the direction of the axial line.

25. The navigation apparatus of claim 24, wherein the numerical data is a telephone number.

26. The navigation apparatus of claim 24, wherein the numerical data is a post code.

27. The navigation apparatus of claim 24, wherein the numerical data is latitude and longitude information.

28. The navigation apparatus of claim 24, wherein the numerical data is position information, which is encoded position data of a specific location.

29. The navigation apparatus of claim 24, wherein said control unit is operable to increment a number designated by the cursor when said joystick is rotated to one side about the axial line, and to decrement a number designated by the cursor when said joystick is rotated to the other side about the axial line.

30. The navigation apparatus of claim 18, wherein said [control means] *controller* comprises an operation detector for detecting each motion of said joystick.

31. The navigation apparatus of claim 30, wherein said operation detector comprises a rotation detector for detecting when said joystick is rotated about the axial line, a lean detector for detecting when said joystick is leaned, and a press detector for detecting when said joystick is depressed in the direction of the axial line.

32. The navigation apparatus of claim 30, wherein said rotation detector comprises a rotary encoder including a plurality of photocouplers for detecting a rotation angle of said joystick.

33. The navigation apparatus of claim 30, wherein said lean detector comprises a plurality of switches for detecting whether said joystick is leaned in one of the plurality of predetermined directions.

34. The navigation apparatus of claim 30, wherein said press detector comprises a spring switch for detecting when said joystick is depressed in the direction of the axial line.

*35. A map display apparatus comprising:*

*a display unit operable to display a map thereon; and*

*an input unit operable to carry out a first input for instruction of scrolling a display of the map displayed on said display unit, and a second input for instruction of an increase or decrease of a scale of the map in accordance with a rotation direction of a rotation operation of said input unit while said input unit is being depressed, said input unit being adapted to be rotated about a longitudinal axial line of said input unit.*

*36. The map display apparatus of claim 35, wherein the scale of the map is increased in response to a clockwise rotation operation of said input unit and is decreased in response to a counterclockwise rotation operation of said input unit.*

*37. The map display apparatus of claim 35, wherein a size of the scale of the map is determined in accordance with a rotation amount of the rotation operation of said input unit.*

*38. The map display apparatus of claim 35, wherein while the first input is being carried out, scrolling in a predetermined direction is continued.*

*39. A map display apparatus comprising:*

*a display unit operable to display a map thereon;*

*an input unit operable to carry out an instruction of scrolling a display of the map displayed on said display unit, said input unit being adapted to be rotated about a longitudinal axial line of said input unit;*

*a rotation detection part operable to detect a rotation operation of said input unit while said input unit is being depressed; and*

*a control unit operable to, when said rotation detection part detects the rotation operation of said input unit, increase or decrease a scale of the map in accordance with a rotation direction of the rotation operation of said input unit.*

*40. The map display apparatus of claim 39, wherein the scale of the map is increased in response to a clockwise rotation operation of said input unit and is decreased in response to a counterclockwise rotation operation of said input unit.*

*41. The map display apparatus of claim 39, wherein a size of the scale of the map is determined in accordance with a rotation amount of the rotation operation of said input unit.*

*42. A map display apparatus comprising:*

*a display unit operable to display a map thereon;*

*an input unit operable to carry out an instruction of scrolling a display of the map displayed on said display unit, said input unit being adapted to be rotated about a longitudinal axial line of said input unit;*

*a rotation detection part operable to detect a rotation operation of said input unit while said input unit is being depressed, said rotation detection part being operable to detect a rotation in accordance with a rotation change amount without fixing a starting position of the rotation; and*

*a control unit operable to, when said rotation detection part detects the rotation operation of said input unit in accordance with the rotation change amount, increase or decrease a scale of the map in accordance with a rotation direction of the rotation operation of said input unit.*

* * * * *